United States Patent
Mura-Smith

[19]

[11] Patent Number: 6,127,945
[45] Date of Patent: Oct. 3, 2000

[54] MOBILE PERSONAL NAVIGATOR

[75] Inventor: Kiyoko Mura-Smith, Los Altos, Calif.

[73] Assignee: Trimble Navigation Limited, Sunnyvale, Calif.

[21] Appl. No.: 08/544,553

[22] Filed: Oct. 18, 1995

[51] Int. Cl.[7] .................................................. G08G 1/123
[52] U.S. Cl. .......................... 340/988; 340/539; 342/457; 701/300
[58] Field of Search ..................... 340/988, 989, 340/990, 995, 539, 573; 342/457; 364/449.2, 449.3, 449.5, 449.7; 701/207, 208, 209, 211, 213, 215, 300

[56] References Cited

U.S. PATENT DOCUMENTS

| | | | |
|---|---|---|---|
| 4,835,537 | 5/1989 | Manion | 340/961 |
| 4,857,840 | 8/1989 | Lanchais | 340/989 |
| 4,963,864 | 10/1990 | Iihoshi et al. | 340/995 |
| 5,025,261 | 6/1991 | Ohta et al. | 342/357 |
| 5,113,185 | 5/1992 | Ichikawa | 340/995 |
| 5,334,974 | 8/1994 | Simms et al. | 340/988 |
| 5,337,041 | 8/1994 | Friedman | 340/573 |
| 5,345,244 | 12/1994 | Gildea et al. | 342/357 |
| 5,412,573 | 5/1995 | Barnea et al. | 340/990 |
| 5,434,789 | 7/1995 | Fraker et al. | |
| 5,497,149 | 3/1996 | Fast | 340/988 |
| 5,546,092 | 8/1996 | Kurokawa e tal. | 340/988 |
| 5,627,547 | 5/1997 | Ramaswamy et al. | 342/357 |
| 5,642,107 | 6/1997 | Cross | 340/990 |
| 5,797,091 | 8/1998 | Clise et al. | 455/404 |

*Primary Examiner*—Brent A. Swarthout
*Attorney, Agent, or Firm*—Wagner, Murabito & Hao LLP

[57] ABSTRACT

A personal navigation device and method for providing location information. In one embodiment, the present invention is comprised of a portable hand-held unit. The portable unit contains a communication system adapted to receive data at and transmit data from the portable unit. The portable unit also contains a position determining system which determines the geographic location of the portable unit. The position determining system is connected to the communication system. A graphic display located on the portable unit is also connected to the position determining system. The graphic display displays a representation of the current location of the portable unit with respect to a previously selected location. In one embodiment, the representation of the current location also includes a representation of the speed and the heading of the portable unit with respect to the previously selected location.

1 Claim, 5 Drawing Sheets

MOBILE PERSONAL NAVIGATOR

TECHNICAL FIELD

This invention relates to navigation devices. Specifically, the present invention relates to a portable navigation device providing relative positioning.

BACKGROUND ART

Complicated navigation devices are well known in the art. Typically, such devices determine a user's geographic position in terms of latitude, longitude, and altitude. The measurements of latitude and longitude are commonly given in degrees, minutes, and seconds, with the measurement of altitude given in feet above or below sea level. While such terms and measurement units may be instructive to those familiar with geo-positioning, such terms and measurements are not always helpful to the average consumer.

In an attempt to present geographic position information in a more user friendly manner, some prior art navigation devices display written information easily understandable to the average consumer. The written information is displayed in addition to conventional latitude, longitude, and altitude measurements. Commonly, the written information includes the speed of the user, the distance of the user from a destination and/or origination, and the direction in which the user is heading. The addition of written information renders prior art navigation devices more "user-friendly". However, such written information is still presented in a format which is not always readily understood by the average consumer. That is, the distance to or from a specific latitude and longitude is a description which many consumers do not find intrinsically explanatory.

In yet another attempt to present geographic position information in a consumer-oriented format, some prior art navigation devices graphically display the position of the user on a detailed map. Thus, the user of the navigation device observes his or her position on a graphically displayed conventional map. Although such a display may be more helpful than latitude and longitude readings alone, such displays are often too "crowded" with information. That is, typical consumers may find that such displays provide so much information that the display screen is both difficult and confusing to read. In addition to the superfluous volume of information presented by a detailed map display, such devices typically require a larger display screen. In order to accommodate the requisite larger display screen, such prior art navigation devices are often fixedly mounted, for example, in vehicles. Due to the required large screen, such systems are not well suited to being hand-carried. Furthermore, such map displaying prior art devices require significant downloading of detailed map information to establish the map database. If the map information is transmitted to the navigation device, the complex and voluminous nature of the detailed map information necessitates complicated and time-consuming transmission schemes.

Thus, a need exists for a navigation device which presents geographic position information in a consumer-oriented format, a navigation device which does not overwhelm a user with complex detailed map information, a navigation device which does not require complicated transmission and time-consuming transmission schemes, and a navigation device which is portable and well suited to being hand-carried.

DISCLOSURE OF THE INVENTION

It is therefore an object of the present invention to provide a navigation device which presents geographic position information in a consumer-oriented format, a navigation device which does not overwhelm a user with complex detailed map information, a navigation device which does not require complicated transmission and time-consuming transmission schemes, and a navigation device which is portable and well suited to being hand-carried. The above object has been achieved by a portable hand-held navigation unit which graphically displays a representation of the relative position of the user with respect to a selected location. In one embodiment of the present invention, the navigation device is an easy to use portable hand-held unit. The portable unit contains a communication system adapted to receive data at and transmit data from the portable unit. The portable unit also contains a position determining system which determines the geographic location of the portable unit. The position determining system is connected to the communication system. A small graphic display located on the portable unit is also connected to the position determining system. The graphic display displays a representation of the current location of the portable unit with respect to a previously selected location. In one embodiment, the representation of the current location also includes a representation of the speed and the heading of the portable unit with respect to the previously selected location. Because the present invention does not require the display of complex detailed map information, transmission of display data to the present invention does not require a complicated or time-consuming transmission scheme.

In another embodiment of the present invention, the user of the portable unit is able to enter waypoints to be displayed on the graphic display. The user can, for example, enter the geographic coordinates of all of the restaurants within a specific geographic area into the portable unit before venturing into the geographic area. As another example, the user can also enter various waypoints into the portable unit as the user travels through a geographic region. The entered waypoints can serve, for example, as guideposts providing a trail back to an origination, can serve as reminders of points of interest to be visited at a later date, and the like.

Therefore, the present invention provides a navigation device which presents geographic position information in a consumer-oriented format, a navigation device which does not overwhelm a user with complex detailed map information, a navigation device which does not require complicated transmission and time-consuming transmission schemes, and a navigation device which is portable and well suited to being hand-carried. These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
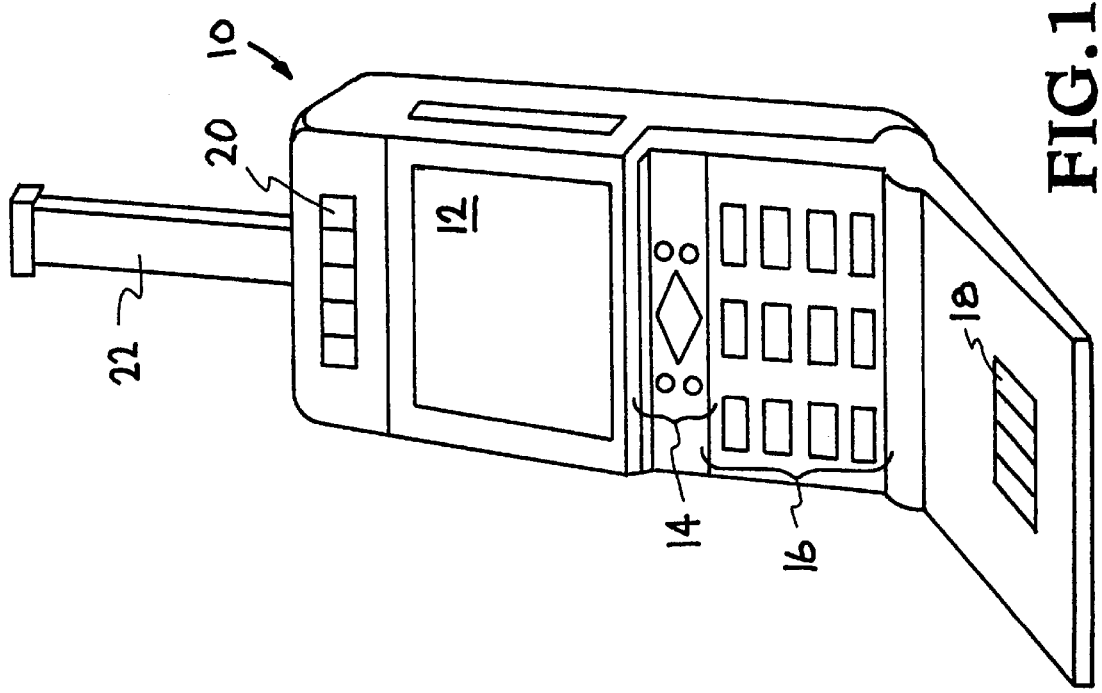
FIG. 1 is a perspective view of a personal navigation device in accordance with the present claimed invention.

With reference now to FIG. 1, a perspective view of one embodiment of a personal navigation device in accordance with the present invention is shown. As shown in FIG. 1, the present embodiment is a portable, hand-held unit 10. The following description of the present invention will begin with a detailed description setting forth the structural characteristics of the present invention. This description will then be followed by a detailed description setting forth the operation of the present invention. Regarding the structure of unit 10, the present embodiment includes a display screen 12, navigation controls 14, a keypad 16, a mouthpiece 18, an ear piece 20, and a transceiver 22.

In the present embodiment, display screen 12 is a 2 by 2 ½ inch display screen. Thus, display screen 12 of the present embodiment has a size which is well suited to being located on portable hand-held unit 10. Additionally, display screen 12 is of sufficient size to clearly display the relative position of a user of unit 10 with respect to, for example, a previously selected location. For purposes of the present application, displaying a representation of the position of the user with respect to a previously selected location is intended to cover displaying the position of the user with respect to a selected location wherein the display does not include extraneous information such as unnecessary streets and the like. Although such a size is specified in the present embodiment, the present invention is also well suited to the use of various other display screen sizes.

Navigation controls 14 and keypad 16 form a user interface mechanism. Specifically, navigation controls 14 are used to select and choose various navigation functions. Navigation functions include the selection of particular waypoints to be displayed on display screen 12, types of information to be displayed, and the like. Keypad 16 is used to perform telephone operations. Likewise, mouthpiece 18 and ear piece 20 perform standard telephone functions. Antenna 22 receives various signals used by portable unit 10. Although portable unit 10 has a specific body style in the present embodiment, the present invention is also well suited to having a different structural configuration.

Figure 2:
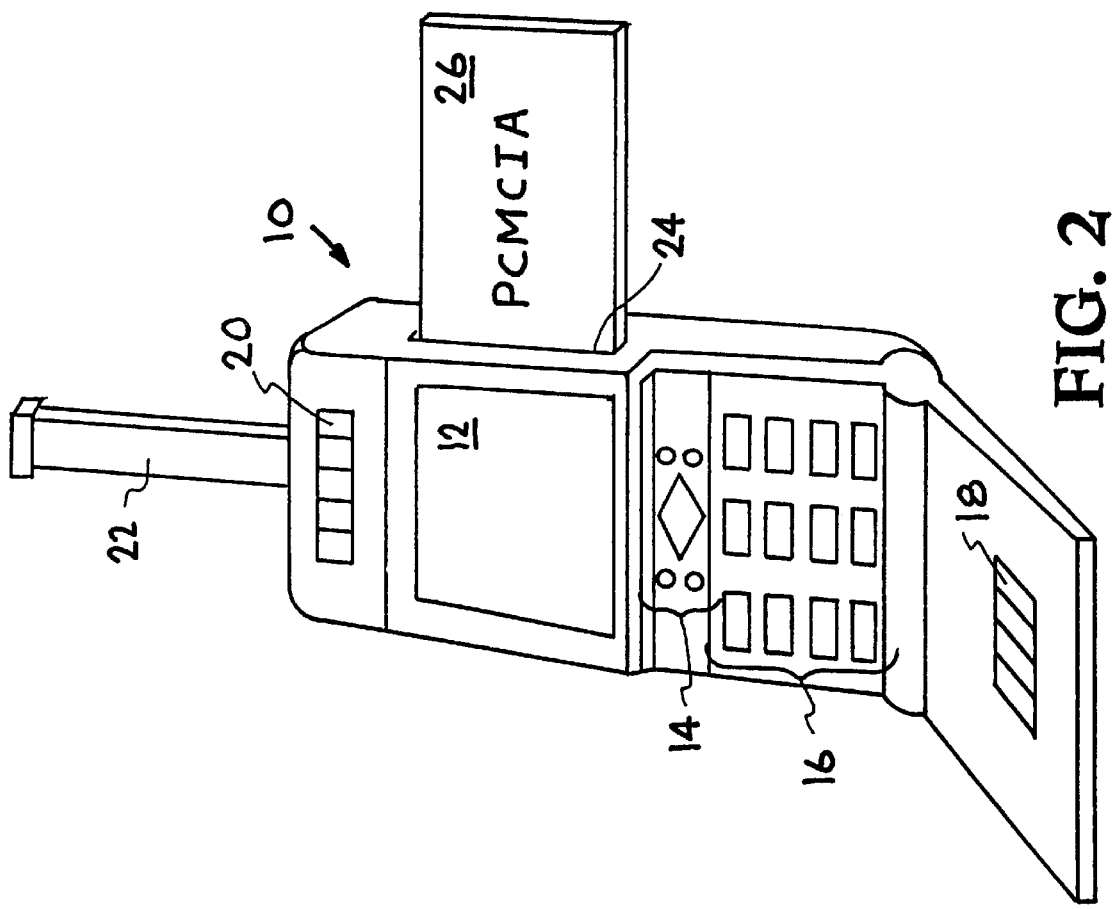
FIG. 2 is perspective view of another embodiment of the personal navigation device of FIG. 1 in which the portable unit includes a module slot in accordance with the present claimed invention.

With reference next to FIG. 2, another embodiment of the present invention is shown in which portable unit 10 includes a data interface 24. As shown in FIG. 2, data interface 24 is adapted to receive, for example, a Personal Computer Memory Card International Association (PCMCIA) module 26. Although the present embodiment specifically recites that data interface 24 is adapted to receive, for example, a PCMCIA module 26, the present invention is also well suited to having data interface 24 adapted to receive various other data transfer devices. Such data transfer devices include, for example, a serial or parallel port connector, a RS-232 interface, a BNC connector, and the like. The present invention is also well suited to having data interface located elsewhere on portable unit 10.

Figure 3:
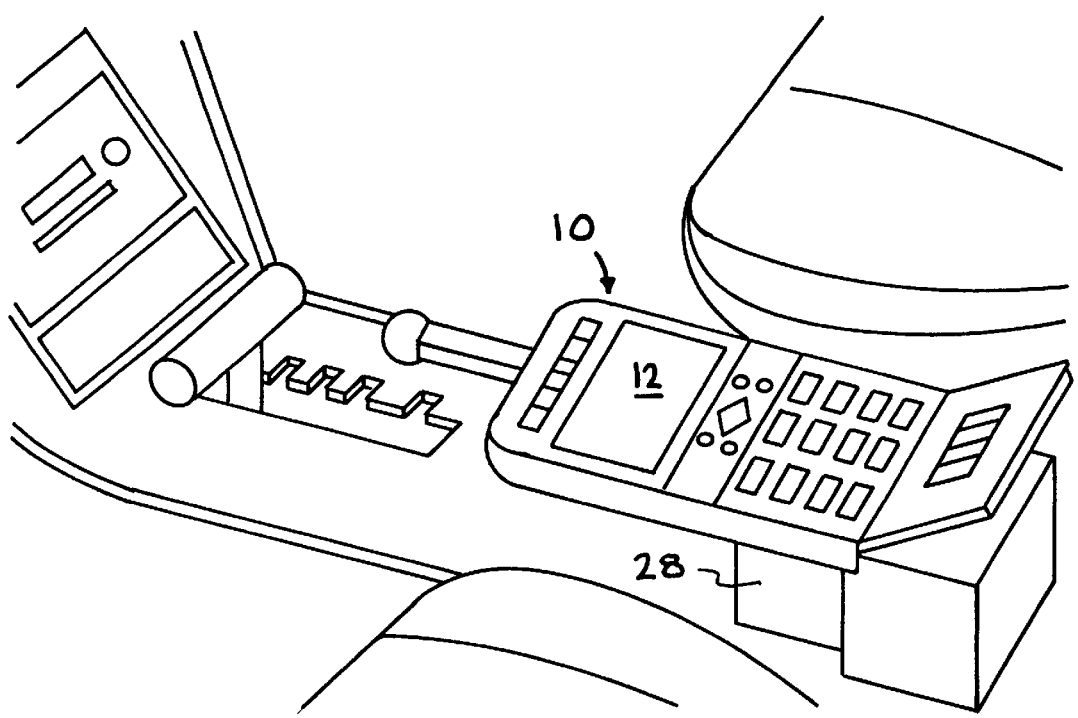
FIG. 3 is a another embodiment of the present invention in which the portable unit of FIG. 1 is removably attachable to a base unit disposed within a vehicle in accordance with the present claimed invention.

Referring now to FIG. 3, yet another embodiment of the present invention is shown in which the portable unit 10 is removably attachable to a base unit 28 disposed within a vehicle. Although portable unit 10 includes a display screen 12 integral therewith, the present invention is also well suited having a display screen, not shown, which is physically separated from portable unit 10. In an embodiment in which the display screen is physically separated from portable unit 10, the display screen is mounted, for example, to the dashboard of the vehicle in which base station 28 is disposed. Although base unit 28 is disposed within a vehicle in the present embodiment, the present invention is also well suited to having base unit 28 located other than in a vehicle. That is, base unit 28 is well suited to being carried, to being located in a home, to being located in an office, and the like.

Figure 4A:
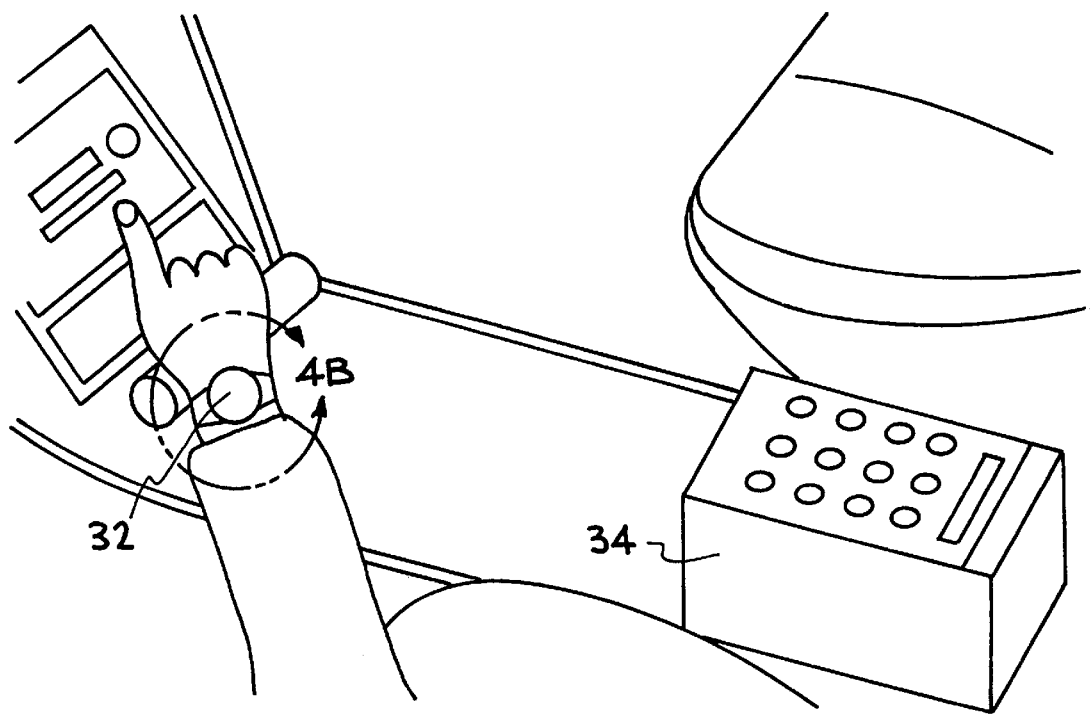
FIG. 4A is another embodiment of the present invention in which a base unit is communicatively connected to a display screen disposed on a wristband in accordance with the present claimed invention.
Figure 4B:
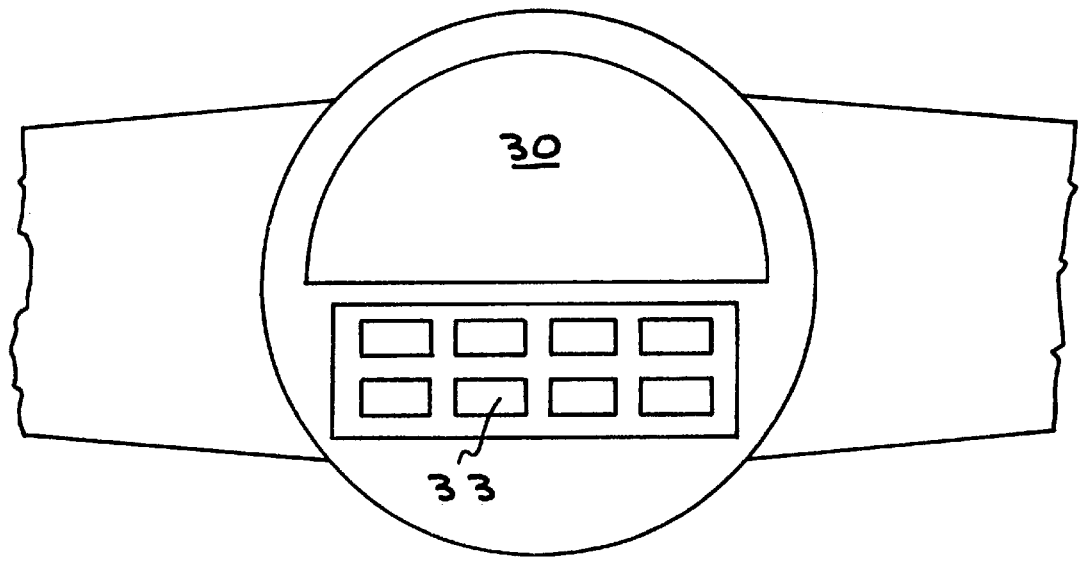
FIG. 4B is expanded view of the wristband FIG. 4A in accordance with the present claimed invention.

With reference next to FIG. 4A, still another embodiment of the present invention is shown in which a display screen 30 is integral with a wristband 32. Wristband 32 also has a user interface mechanism such as a keypad 33 integral therewith. A base unit 34 is communicatively coupled to display screen 30 of wristband 32. As in the embodiment of FIG. 3, although base unit 34 is disposed within a vehicle in the present embodiment, the present invention is also well suited to having base unit 34 located other than in a vehicle. An expanded view of wristband 32 is shown in FIG. 4B.

Figure 5:
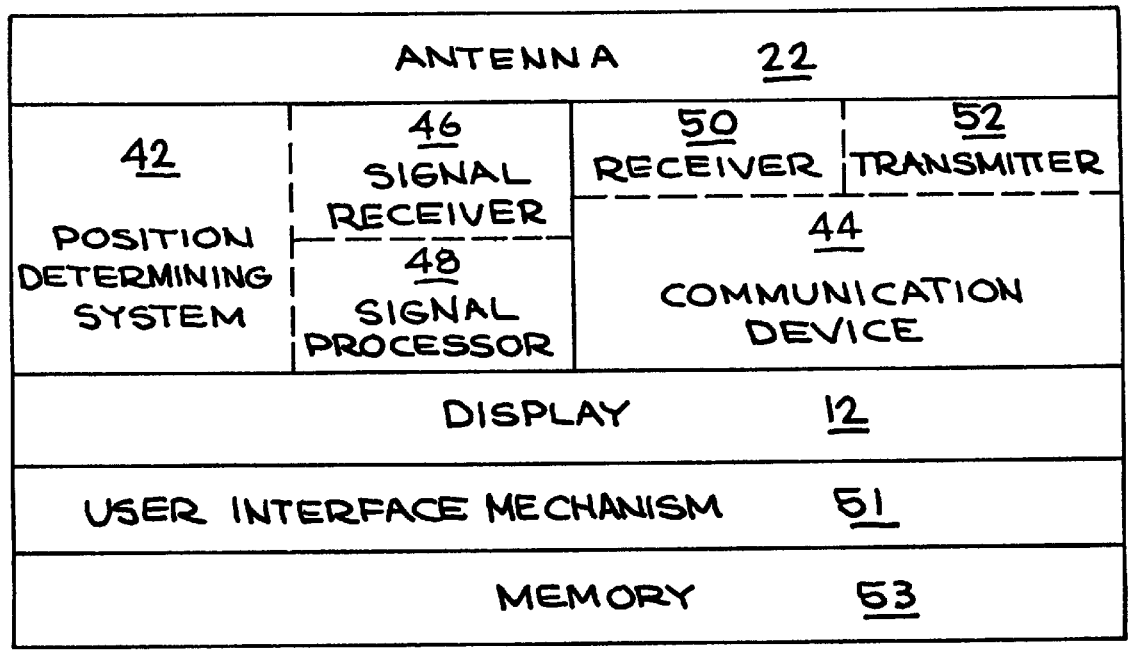
FIG. 5 is a schematic diagram showing various components of the portable unit in accordance with the present claimed invention.

With reference to FIG. 5, a schematic diagram of various components of the present invention is shown. The components include an antenna 22 coupled to a position determining system 42 and a communication device 44. As shown in the present embodiment, position determining system 42 includes a signal receiver 46 and a signal processor 48. Communication device 44 includes a receiver 50 and a transmitter 52. Other component include, but are not limited to, a display 12, a user interface mechanism 51, and memory 53. User interface mechanism 51 includes such items as navigation controls 14 and keypad 16 of FIGS. 1 and 2.

Figure 6:
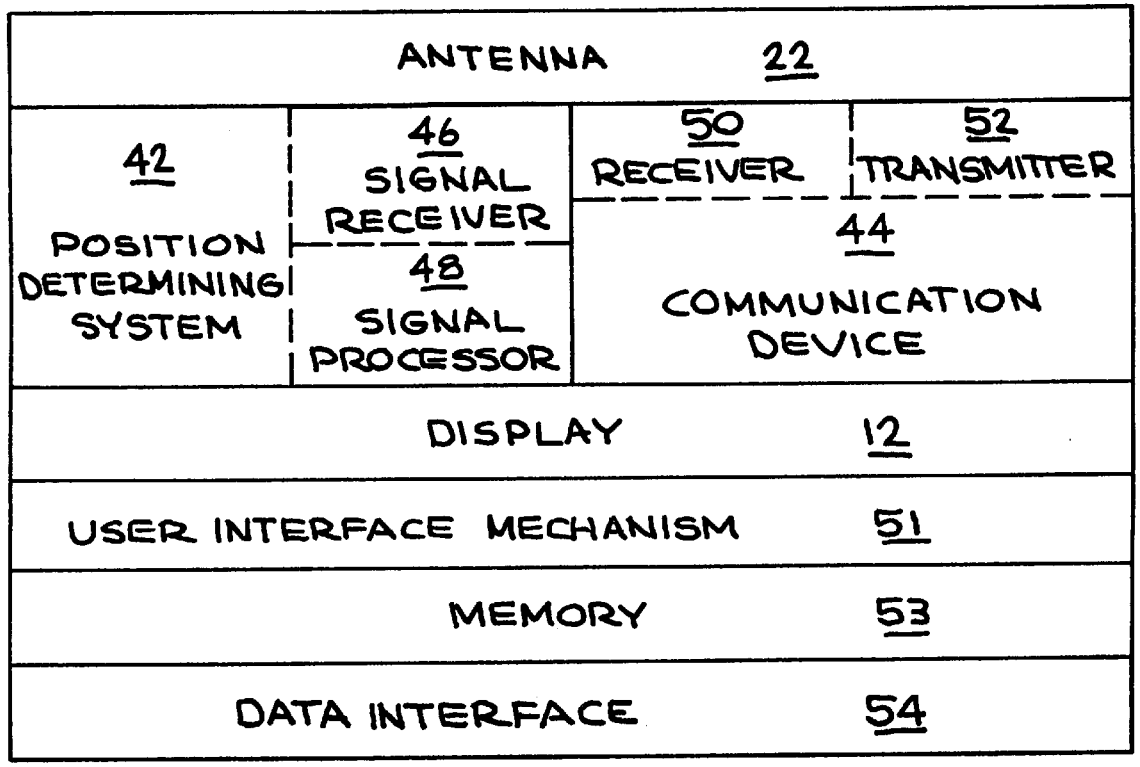
FIG. 6 is a schematic diagram as shown in FIG. 5 with the addition of a data interface in accordance with the present claimed invention.

Referring now to FIG. 6, a schematic diagram of various components of another embodiment of the present invention including a data interface 54 is shown. As shown in FIG. 6, the present embodiment includes all of the components of the embodiment of FIG. 5 in addition to data interface 54. Data interface 54 accommodates the transfer of data therethrough via, for example, data transfer devices such as, a serial or parallel port connector, a RS-232 interface, a BNC connector, and the like.

Figure 7:
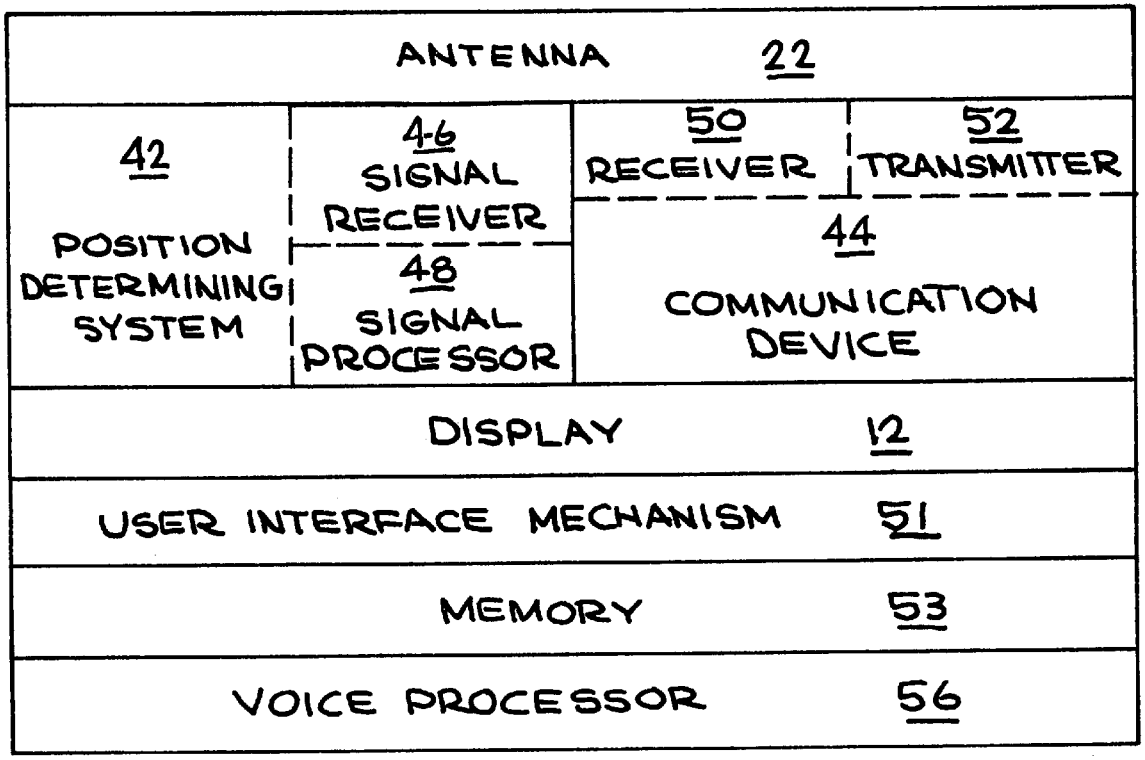
FIG. 7 is a schematic diagram as shown in FIG. 5 with the addition of a voice processor in accordance with the present claimed invention.

Referring next to FIG. 7, a schematic diagram of various components of yet another embodiment of the present invention including a voice processor 56 is shown. As shown in FIG. 7, the present embodiment includes all of the components of the embodiment of FIG. 5 in addition to voice processor 54. The present embodiment is also well suited to the inclusion of a data interface component as shown in FIG. 6.

IN OPERATION

The following is a detailed description of the operation of the present invention. With reference to the embodiment of FIG. 1, portable unit 10 is typically "hand-carried" by a user of the present invention. The relative position of the user with respect to at least one selected location is displayed on screen 12. User interface mechanisms such as navigation controls 14 and keypad 16 allow the user to operate portable unit 10. The present invention allows a user to easily navigate to, for example, a selected location by monitoring the relative position of the portable unit with respect to the selected location. Hence, the present invention does not clutter display screen 12 with details which are unnecessary to the user. That is, instead of displaying numerous streets and the like, the present embodiment displays only the relative position of the user with respect to the selected location. As a result, a user of the present invention is able to easily navigate to a selected location without being distracted by the presence of extraneous display features on display screen 12.

Figure 8A:
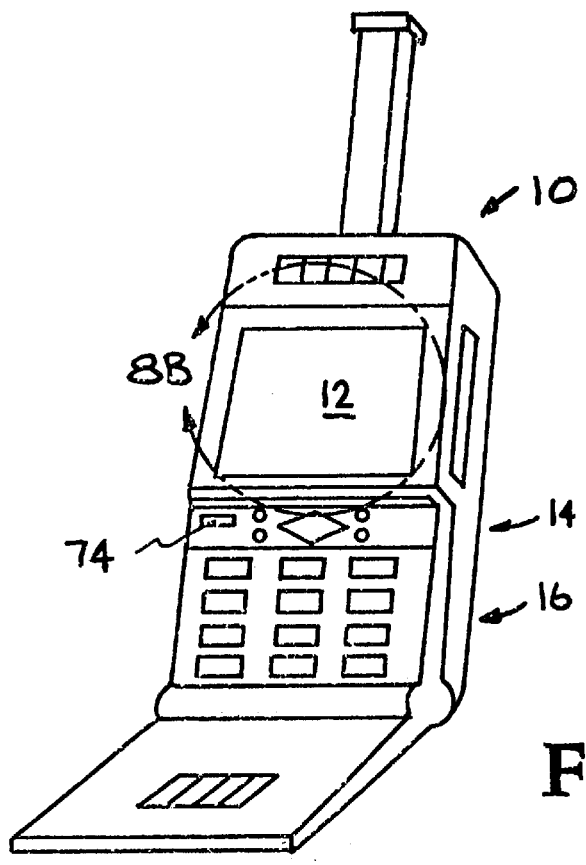
FIG. 8A is a perspective view of the portable unit of FIG. 1 with a display screen containing icons in accordance with the present claimed invention.
Figure 8B:
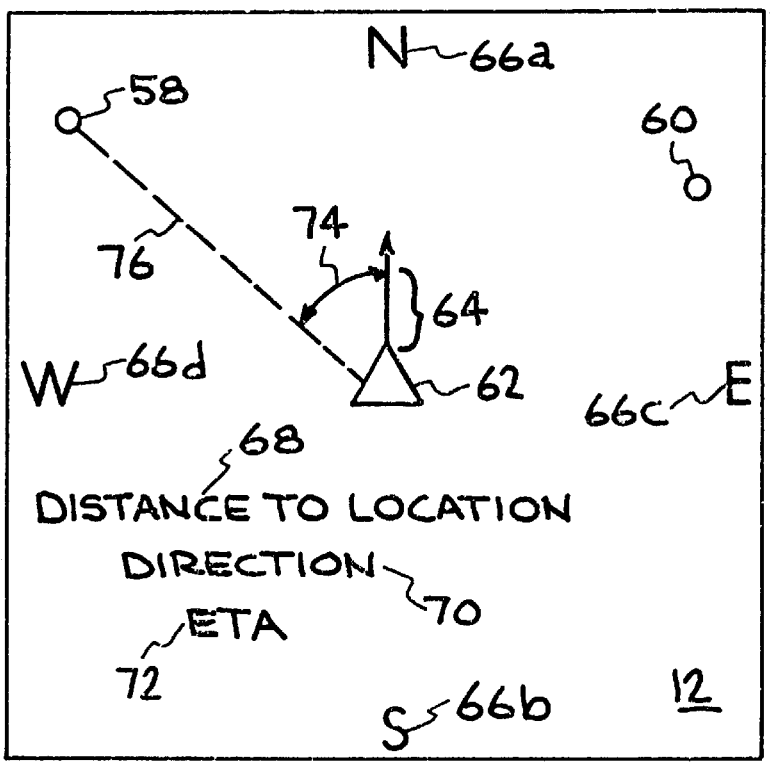
FIG. 8B is expanded view of the display screen FIG. 8A in accordance with the present claimed invention.

With reference next to FIGS. 8A and 8B, a perspective view of portable unit 10 and an expanded view of display screen 12 is shown. In the present embodiment, portable unit 10 has at least one selected location programmed or stored in memory 53 of FIG. 5. The selected locations are visually represented by icons 58 and 60 on display screen 12. The selected locations stored in portable unit 10 include for example, restaurants, theaters, points of interest, and the like. In the present invention, the selected locations can be entered, for example, by a service provider. Service providers can include for example, rental car companies, hotels, tourist information agencies, travel agents, and the like. As an example, a rental car company can enter or store all of the locations at which customers can return rented vehicles. Likewise, hotels can enter the location of various restaurants located proximate to the hotel. A tourist information agency can store numerous locations which might be of interest to a tourist.

In the present embodiment, service providers enter the selected locations using position information such as latitude, longitude, and altitude. The present invention is, however, well suited to having the selected locations entered by address. When selected locations are entered by address, the present invention must have access to "geo-coding" data. Geo-coding data provides latitude, longitude, and altitude coordinates corresponding to the entered addresses of the selected locations. The present invention is also well suited to having selected locations entered into portable unit 10 by various other methods. For example, the present invention is well suited to having the service provider simply enter the phone number corresponding to a selected location. If a phone number is used to designate a selected location, the present invention must also have access to a data base which provides the latitude, longitude, and altitude corresponding to the entered phone number.

The present invention is also well suited to having position information of a selected location remotely entered into portable unit 10. The position information of the selected location is transmitted from, for example, a service provider to portable unit 10. Antenna 22 and receiver 50 of communication device 44, all of FIG. 5, receive the transmitted position information. Thus, a service provider can remotely augment, update, correct, or delete position information of portable unit 10. Therefore, even when portable unit 10 is, for example, being carried by a user, the present invention provides for data transfer between portable unit 10 and a remotely located transmitter.

The present invention is also well suited to obtaining data from, for example, a pay per view service provider. As an example, a service provider can provide at a fee, a list of all restaurants located proximate to the user's current position. Likewise, a user of the present invention can also order a listing of nearby gasoline stations, theaters, and the like. Thus, the present invention is well suited for use with service providers seeking to sell their database information to user's of portable unit 10.

The communication link between portable unit 10 and a remote transmitter is established using any one of numerous communication link or transmission techniques well known in the art. As an example of transmission techniques which are well suited for the present invention, communication between portable unit 10 and a base station can be established using a Metricomm Wide Area Network (WAN) link operating at approximately 900 MHz. A Communication link can be established using a standard cellular telephone connection. A Communication link can also be established using a trunked radio system. In such a system for example, portable unit 10 first contacts headquarters or a communication base and is assigned a communication channel. Communication between portable unit 10 and the base station must take place over the assigned channel. A communication link between portable unit 10 and a base station can also be established using a Cellular Digital Packet Data (CDPD) protocol. In the CDPD protocol, a modem and a radio are used to send data at a rate of 19.2 Kbits/s over cellular circuits not currently being used for voice transmissions. A control channel is called, for example, by portable unit 10, and portable unit 10 is then assigned a channel. Portable unit 10 then bursts packet data, using, for example, TCP/IP protocol, to deliver the data to the base station until the data is completely transmitted or until the channel is no longer free. If the data is not completely transferred when the channel expires, the communication link is then established using a different channel. As yet another example, a communication link can be established using a Subscription Mobile Radio (SMR) system wherein an assigned frequency is used for the link. The present invention is also well suited to having an rf-based communication link. Hence, in addition to allowing a user to perform standard telephone operations, communication device 44 of portable unit 10 also enables over-the-air data transmission.

In the present embodiment, the data downloaded from a base station to portable unit 10 is in a readily usable format such as, for example the portable document format (PDF) by Adobe. Although such a format is mentioned as an example in the present embodiment, the present invention is also well suited to the use of numerous other file formats well known in the art.

Although the above description specifically mentions a service provider, the present invention is well suited to having the selected locations entered by someone other than a service provider. That is, the present invention is also well suited to having the user or another party enter position information corresponding to selected locations.

Additionally, the present invention is also well suited to having selected locations removed from portable unit 10. That is, as a user decides that a selected location is no longer of interest, the user or another party can simply remove the selected location from portable unit 10. The present invention is also well suited to having a set number of selected locations reserved in portable unit 10. Such locations would, for example, be those location entered by a service provider for the benefit of clients.

With reference next to FIG. 5, as portable unit 10 of FIG. 1 is carried about, position determining system 42 generates position information indicative of the position of portable unit 10. Specifically, signal receiver 46 receives radio navigation signals and then transfers the received radio navigation signals to signal processor 48. Signal processor 48 uses the received radio navigation signals to determine position information of portable unit 10. In the present invention, position determining system 42 is, for example, a satellite-based radio navigation system such as the Global Positioning System (GPS), or the Global Orbiting Navigational System (GLONASS). Although such systems are specifically mentioned in the present embodiment, the present invention is also well suited to land-based radio navigation systems such as, for example, LORAN, and Decca. Additionally, the present invention is also well suited to recording GPS ephemeris data. Likewise, the present invention is also well suited to recording position information which has undergone differential corrections to provide more accurate position information.

Position determining system 42 is also able to generate velocity information by measuring the Doppler shift of signals between the position determining system 42 and at least one radio navigation signal transmitter, for example, one of the GPS satellites, not shown. Thus, components such as speed, direction, and heading of portable unit 10 of FIG. 1 are obtained by position determining system 42. Additionally, position determining system 42 very accurately determines the time at which portable unit 10 is at any specific location.

With reference next to FIGS. 8A and 8B, the geographic position of portable unit 10 is represented as a cursor or "carrot" 62 on display screen 12. In the present embodiment, cursor 62 is centrally located on display screen 12. Selected locations 58 and 60 are also displayed on display screen 12. In the present embodiment, selected location 58 is a desired destination, while selected location 60 is, for example, a prominent landmark. By displaying a representation of the position of selected locations 58 and 60 and cursor 62 on display screen 12, the "relative position" of portable unit 10 with respect to the selected locations is readily determined. In the present embodiment, a representation of both the selected locations and the position of portable unit 10 is displayed on screen 12. Thus, the present invention adjusts the "scale" or "screen height" of display screen 12 such that the representation of both the selected locations and the position of portable unit 10 will fit on display screen 12.

Cursor 62 rotates such that cursor 62 points towards the direction in which portable unit 10 is moving. As shown in FIG. 8B, the present embodiment also includes a vector 64 extending from cursor 62. Vector 64 extends from cursor 62 towards the direction in which portable unit 10 is moving. The length of vector 64 corresponds to the speed of portable unit 10. Thus, the faster portable unit 10 moves, the greater the length of vector 64. Therefore, the present invention provides the relative position of portable unit 10 and the relative velocity (speed and heading) of portable unit 10 with respect to selected locations. As a result, a user of the present invention clearly sees both the user's current position with respect to selected locations, and the user's speed and heading with respect to selected locations.

In the present embodiment, position determining system 42 of FIG. 5 monitors the position of portable unit 10. Position determining system 10 determines the position information of portable unit 10, and generates new position information whenever portable unit 10 is moved.

With reference next to FIGS. 8A and 8B, as portable unit 10 is moved, the relative position of cursor 62 with respect to selected locations such as, for example, locations 58 and 60 is changed accordingly. As portable unit 10 is moved due north, locations 58 and 60 are moved across display screen 12 in a southerly direction. The distance which locations 58 and 60 are moved to the south corresponds to the distance moved by portable unit 10 to the north. If portable unit 10 is moved, for example, due east, locations 58 and 60 are moved across display screen 12 in a westerly direction. Once again, the distance which locations 58 and 60 are moved to the west corresponds to the distance moved by portable unit 10 to the east. Therefore, cursor 62 always remains centrally located on display screen 12. Additionally, the representation of the relative position of cursor 62 with respect to selected locations, such as for example, locations 58 and 60 remains accurate. Hence, in the present embodiment, only the position of the selected locations on display screen 12 is changed as portable unit 10 is moved.

In the present embodiment, north, south, east, and west indicators (66a–66d) are fixed at the top, bottom, right, and left sides, respectively, of screen 12. The present invention is, however, well suited to other types of screen display formats. Other types of screen display formats include, for example, a heads-up format. In a heads-up display format, cursor 62 points upward regardless of the direction in which portable unit 10 is being moved. Hence, in the aforementioned heads-up display format, the position of the north, south, east, and west indicators (66a–66d) move around the periphery of display screen 12. In such an embodiment, north, south, east, and west indicators (66a–66d) move such that cursor 62 points at the indicator corresponding to the direction in which portable unit 10 is moving. The present invention is also well suited to a display format in which the position of cursor 62 moves across display screen 12.

With reference still to FIGS. 8A and 8B, the present embodiment also displays navigational information in text form on display screen 12. As shown in FIGS. 8A and 8B, navigational information displayed in text format includes, for example, "Distance to Destination" 68, "Direction" 70, and "ETA" (estimated time of arrival) 72. In the present embodiment, Distance to Location 68 is the distance "as the crow flies" from portable unit 10 to a selected location. Direction information 70 recites the direction in which portable unit 10 is heading. ETA information 72 estimates the time it will take portable unit 10 to reach the selected location based upon the speed at which portable unit 10 is currently traveling. Although such navigation information is displayed in the current embodiment, the present invention is also well suited to displaying other navigation information including, but not limited to, time information, latitude, longitude, and altitude information, and the like.

Referring still to FIGS. 8A and 8B, the present embodiment also displays "cross track error" indicia 74. In the present embodiment, a dotted line 76 extends from cursor 64 to the selected location or destination 58. Dotted line 76 indicates the most expedient path as the crow flies to destination 58. Cross track error indicia 74 indicates the difference between the current heading of portable unit 10 and the most expedient heading indicated by dotted line 76. Thus, barring any obstruction, a user of portable unit 10 can alter a current heading to conform to the heading suggested by dotted line 76.

With reference still to FIGS. 8A and 8B, the present embodiment, unlike prior art navigation devices, does not "crowd" display screen 12 with superfluous map details. Instead of crowding screen 12, the present embodiment efficiently displays only a representation 62 and 64 of the relative position and relative velocity, respectively, of portable unit 10 with respect to selected locations. That is, the present invention clearly shows a user "where the user is with respect to where the user wants to go." Thus, the "concise" display of the present embodiment enables a user to easily navigate using portable unit 10.

In addition to the above-described display features, the present invention also includes user interface mechanisms to render portable unit 10 user-friendly. Navigation controls 14 allow the user to, for example, select which types of navigation information are to be displayed on screen 12. In the present embodiment, navigation controls also enable a user to enter additional selected locations into portable unit 10. As an example, if the user passes an interesting site on the way to a destination, the user simply engages a location recording key of navigation controls 14. The geographic location is then stored in portable unit 10. If desired, the user then enters a description of the interesting site using navigation controls 14 or key pad 16. When desired, the user calls up the previously entered interesting site, again using navigation controls 14, and an icon representing the interesting site is displayed on screen 12. The user then can navigate to the interesting site using portable unit 10. The present invention is also well suited to time-stamping the interesting site, such that the user will know the precise time at which the site was stored in portable unit 10.

In addition to storing the location of an interesting site for future reference, the present invention is also well suited to providing a trail back to an origin. In such an instance, a user venturing out on a route periodically engages the navigation recording key of navigation controls 14 as the user travels along the route. As the locations are stored, the locations are also time-stamped. When the user desires to return to an origin, such as, for example, a hotel, the user simply navigates to each of the entered locations from last entered to first entered. In so doing, the user completely back tracks the route traveled earlier, and returns to the starting point of the route. Hence, the present invention prevents the user from becoming lost.

The user interface mechanism of the present invention, for example navigation controls 14 and keypad 16, includes other user-friendly features. The present embodiment includes an emergency transmission activator 75. Once activated, emergency transmission activator 75 causes portable unit 10 to transmit an emergency message, including the present location of portable unit 10, to a selected recipient. The present invention is well suited to transmitting the emergency message to, for example, a 911 operator. Emergency messages include, for example, automobile accidents, personal injury, criminal attacks, and the like.

With reference again to FIG. 7, in an embodiment where the present invention includes a voice processor mechanism 56, emergency transmission activator 75 of FIG. 8A is able to cause a voice message to be sent to a selected recipient. In many prior art transmission schemes, latitude, longitude, and altitude position information is reported using a compilation of tonal signals. Tonal signal messages are only useful when the recipient is equipped to de-code the tonal messages. By transmitting latitude, longitude, and altitude position information using a voice message, the present invention increases the number of potential recipients of an emergency message. Therefore, if a user of portable unit 10 is, for example, unable to speak, the present invention allows the user to summon help and report the user's current position information all at the push of a button.

With reference again to the embodiment of FIG. 2, the present invention is also well suited to having selected locations entered via data interface 24. In the present embodiment, a user would select, for example, from numerous PCMCIA cards containing various information. As an example, a tourist might choose between PCMCIA cards separately covering restaurants, theaters, state parks, and the like. The tourist then inserts the chosen PCMCIA card into data interface 24 and the desired information is loaded into portable unit 10. Navigation in the present embodiment is performed in a manner similar to that described in conjunction with the embodiment of FIG. 1. The present invention is also well suited to loading detailed map information into portable unit 10 if desired.

With reference next to the embodiment of FIG. 3, the present invention is also well suited to being removably disposed within a vehicle. In the present in-vehicle embodiment, a user places portable unit 10 onto a base unit 28. As the user drives along, the user navigates using portable unit 10 mounted into base 28. Navigation is performed in a manner similar to that described in conjunction with the embodiment of FIG. 1. When the user leaves the vehicle, the user simply detaches portable unit 10 from base 28 and carries portable unit 10 wherever the user travels. In the present embodiment, portable unit 10 functions as a cellular telephone when placed in base 28. When removed from base 28, portable unit 10, functions as a cordless telephone and wirelessly communicates with base 28 back in the vehicle. Thus, the present invention is well suited to receiving communications from a service provider at base 28. The received transmissions are then transmitted from base 28 to portable unit 10 via the aforementioned wireless link. In so doing, portable unit 10 is able to receive and transmit data even when not located in a vehicle. Furthermore, because base 28 functions as an intermediate receiver/transmitter, portable unit 10 does not require a substantial battery power supply for reception and transmission of data.

The present in-vehicle embodiment is also well suited to having a separate much larger display screen, not shown, mounted in the vehicle. In such an embodiment, the representation of the relative position of portable unit 10 with respect to selected locations is displayed on the larger display screen. Thus, the present in-vehicle embodiment makes it easy for a vehicle occupant to observe the relative position of portable unit 10 with respect to selected locations.

With reference next to the embodiment of FIGS. 4, the present invention is also well suited to having a display screen 30 and navigation controls and/or keypad 33 integral with a wristband 32. A representation of the relative position of wristband 32 with respect to selected locations is displayed on the display screen 30. The present embodiment also allows the user to perform navigation functions using navigation controls and/or keypad 33. Navigation is performed in a manner similar to that described in conjunction with the embodiment of FIG. 1. The present wristband embodiment is also well suited to having a separate much larger display screen, not shown, mounted proximate to base unit 34. In such an embodiment, the representation of the relative position of wristband 32 with respect to selected locations is displayed on the larger display screen. Thus, the present wristband embodiment makes it easy for a user to observe the relative position of wristband 32 with respect to selected locations.

Thus, the present invention provides a navigation device which presents geographic position information in a consumer-oriented format, a navigation device which does not overwhelm a user with complex detailed map information, a navigation device which does not require complicated transmission and time-consuming transmission schemes, and a navigation device which is portable and well suited to being hand-carried.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A personal navigation device comprising:

a portable navigation unit adapted to be hand-held, said portable navigation unit including;

a communication device adapted to receive data and transmit data therefrom, a position determining system determining the geographic location of said portable navigation unit, and a graphic display coupled to said position determining system, said graphic display adapted to display only a representation of the current location of said portable navigation unit with respect to a previously selected location such that said portable navigation unit provides a cursor, a vector extending from said cursor towards the direction in which said personal navigation device is moving, wherein the length of said vector corresponds to the speed of said portable navigation unit such that the faster said portable navigation unit moves the greater the length of said vector, said graphic display further adapted to display icons representing selected locations and cross track error indicia, said graphics display not providing extraneous information including latitude, longitude and complex map information of said geographic location of said portable navigation unit on said display.

\* \* \* \* \*